Jan. 23, 1962 G. F. VANDERSCHMIDT 3,018,436
APPARATUS FOR MEASURING PHYSICAL QUANTITIES
Filed March 13, 1959 2 Sheets-Sheet 1

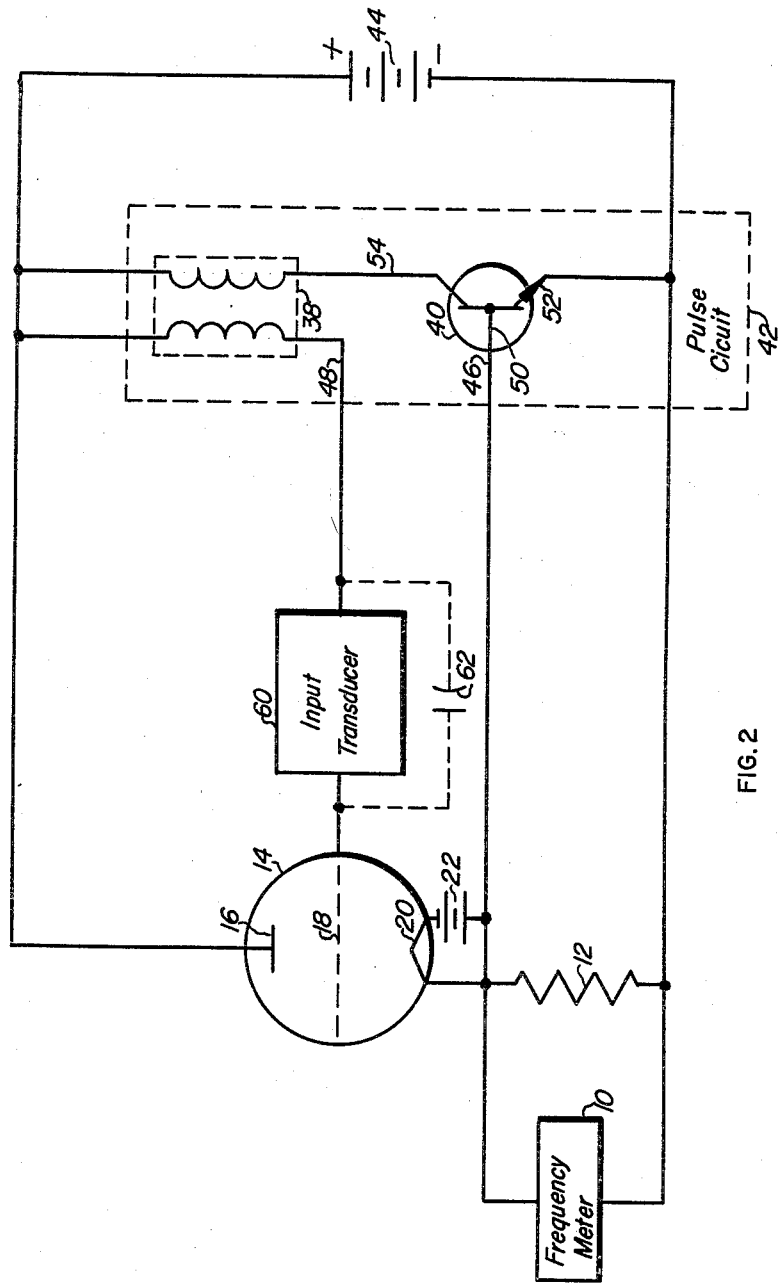

United States Patent Office 3,018,436
Patented Jan. 23, 1962

3,018,436
APPARATUS FOR MEASURING PHYSICAL QUANTITIES
George F. Vanderschmidt, Cambridge, Mass., assignor to National Research Corporation, Cambridge, Mass., a corporation of Massachusetts
Filed Mar. 13, 1959, Ser. No. 799,203
3 Claims. (Cl. 324—33)

This application is in part a continuation of my copending application, Serial No. 767,312, filed October 15, 1958.

The present invention relates to an improvement in the general type of measuring system described in my copending application, Serial No. 699,860, filed November 29, 1957. In that measuring system a capacitor is discharged at a rate dependent upon the rate of ion production occurring in an ion chamber. This ion chamber is an input transducer having the properties of a current source since it produces a current which is substantially independent of hte voltage applied thereto. Accordingly, this transducer can also be considered as an element having very high internal resistance. The present invention is particularly directed to an improved system for effecting the recharging of a transducer capacitance subsequent to the partial neutralization of the charge on the transducer capacitor by the current flowing in the transducer.

The principal object of the invention is to provide an apparatus for efficiently and quickly measuring a wide range of physical quantities by using the capacitor discharge method.

Another object of this invention is to produce a rugged apparatus for recharging a capacitor in a transducer circuit in a minimum amount of time.

Other objects of the invention will in part be obvious and will in part appear hereinafter.

The invention accordingly comprises the apparatus possessing the construction, combination of elements, and arrangement of parts which are exemplified in the following detailed disclosure and accompanying drawings, and the scope and application of which will be indicated in the claims.

In my copending application, Serial No. 699,860, the gauge described includes an electrometer tube, an ion chamber, a trigger circuit, a relay, and a counting rate meter. The grid of the tube is connected to the negative electrode of an ion chamber. The chamber is designed to act as a capacitor and is charged by a negative voltage applied to the ion chamber inner electrode by means of a relay and a voltage source. The relay is periodically closed by a pulse from a trigger circuit actuated by a rise in the cathode voltage of the electrometer tube when the tube begins to conduct.

FIG. 2 is a further diagrammatic schematic illustration of the invention;

Figure 1:
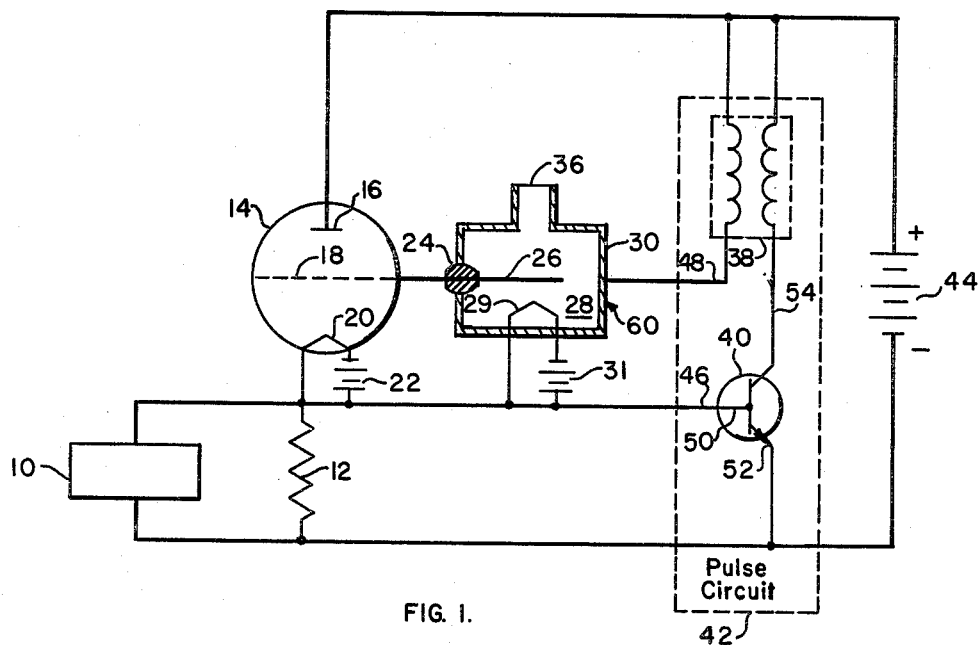
FIG. 1 is a diagrammatic schematic illustration of the invention.

As described in my above-mentioned copending parent application, Serial No. 767,312, such an ion gauge when combined with the circuit described below can be recharged by directly connecting the negative electrode of the ion chamber to the grid of the electrometer tube. In this circuit which is also illustrated in FIG. 1 the grid and inner more negative electrode 26 of the ion chamber 60 are substantially completely isolated from other parts of the circuit and from ground by insulator 24, so that the node comprising the grid 18 and inner more negative electrode 26 is capable of holding a negative electrostatic charge. The capacitance of the ion chamber 60 causes the negative electrode and grid potential to rise with respect to the electrometer tube cathode 20 whenever a positive potential is applied to the chamber wall 30. A pulse supplied by the pulse circuit 42 tends to place a positive voltage on the chamber wall 30. The higher voltage on the ion chamber wall 30 acts to raise grid potential and permits grid current to flow and electrons to collect on the grid 18, thereby creating a negative electrostatic charge on the inner electrode 26 of the chamber. The charging time should be small to allow for more accurate readings at high ion currents, as will be explained below.

The electrons present in the space charge surrounding the cathode 20 provide a ready source of current and these electrons effectively clamp the grid 18 near cathode potential, although the grid is being induced to a more positive potential by the voltage of the ion chamber wall 30, and the electrons in the space charge provide an extremely large residual source of current for short period peak currents or pulses. This ready source of current makes the charging time of the ion chamber short.

Thus, when the charging voltage is removed, the ion chamber 60 is charged to an amount approximately equal to the amplitude of the pulse. When the charging voltage is removed, the outer wall voltage drops. The ion chamber 60 acts as a capacitor and the node comprising the inner electrode 26 and the grid 18 now becomes negative with respect to the more positive outer electrode of the ion chamber 60 by an amount approximately equal to the amplitude of the pulse. The grid 18 of the electrometer tube is driven sufficiently negative with respect to the cathode 20 so that plate current is cut off or substantially reduced.

Positive ions are formed from the gas in the ion chamber 60 during the operation of the chamber as a result of bombardment of gas molecules by electrons from cathode 29, for example, these positive ions are attracted to the negative electrode 26 and upon arriving at the negative electrode, reduce the negative charge on that electrode. The voltage across the electrode pair 26—30 therefore falls at a rate which is proportional to the rate of ionization in the chamber 60.

When the ion chamber voltage has fallen a predetermined amount, then the negative grid bias is raised sufficiently so that plate current in the electrometer tube 14 will flow. The rise in potential across a cathode resistor 12 acts as a signal voltage which causes the pulse circuit 42 to be actuated. Then the cycle is completed and repeats.

Figure 3:
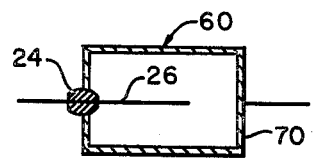
FIG. 3 shows an ion chamber.

The present invention is useful in conjunction with numerous types of input transducers other than the specific ion gauge mentioned above. The principal requirement for the input transducer is that it have the properties of a current source, i.e., that it produce a current which, over the range of interest, is substantially independent of the voltage applied to the transducer. This transducer can be (as illustrated in FIG. 3) an ion chamber filled with a gas which is ionized by incident radiation so that the repetition rate of the recharging pulse is a function of the intensity of the incident radiation. Equally the transducer can be other types of current sources such as various types of ion gauges. For convenience of illustration in FIG. 2 the invention will accordingly be hereinafter described in its generic sense with the use of the term transducer in place of narrower ion chamber designation. In all FIGURES the same numbers have been used for similar elements.

The diagram shows an electrometer tube 14, an input transducer 60 (generically corresponding to ion chamber 60 of FIG. 1), a pulse circuit 42 and a frequency meter 10.

The electrometer vacuum tube 14 is preferably composed of three electrodes comprising a plate 16, a grid 18, and a cathode 20. The cathode is heated by a suitable voltage source such as a battery 22. The plate voltage is supplied by a D.C. voltage source 44 which is connected to the plate 16.

Grid 18 of tube 14 is connected to the negative electrode of the input transducer 60. Grid 18 and the negative electrode of the transducer are isolated from the other electrical elements except for the capacitance of the chamber wall or transducer 60. The capacitor 62 may be used in parallel with transducer 60. The positive electrode of transducer 60 is connected to the output terminal 48 of pulse circuit 42. Frequency meter 10 is connected across a cathode resistor 12. The input terminal 46 of pulse circuit 42 is electrically connected to the cathode 20 of the electrometer tube 14.

Pulse circuit 42 operates as a blocking oscillator. It preferably comprises a transistor 40, a transformer 38, an input terminal 46 connected to the secondary of transformer 38 which is connected to the plate power supply 44. The emitter 52 of transistor 40 is connected to ground.

In general, the blocking oscillator generates an output pulse when the voltage of the base 50 rises above ground potential. The voltage of collector 54 is more positive than the voltage of base 50. The voltage from collector 54 to base 50 causes current flow in the collector branch of the circuit through the primary winding of transformer 38. The current in the primary winding of transformer 38 induces a voltage in the secondary winding of transformer 38 due to the mutual inductance between the windings. This secondary voltage has a polarity such that it raises the potential of the chamber wall 60 with respect to ground. The capacitance across the transducer 60 causes the increase of potential upon the positive electrode thereof to cause an equal net increase in the potential of the more negative electrode. The grid 18 is connected to the negative electrode so it is at the same potential as the negative electrode. The rise in voltage of grid 18 will cause an increased flow of plate current. The plate current through the cathode resistor 12 of the cathode follower circuit shown will cause a rise with respect to ground in the voltage of transistor base 50. The voltage rise in the components of the circuit will continue until the transformer 38 or the transistor 40 becomes saturated. When saturation occurs, the voltage induced in the secondary winding of transformer 38 will decrease and the grid voltage connected through the capacitance of the transducer 60 to the secondary of transformer 38 will also decrease. The grid voltage will fall to a value near ground potential or more negative. The plate current in tube 14 may be cut off. The total effect is a voltage pulse measurable throughout the circuit. The charge built up upon the electrodes of chambers 60 will be measurable as a voltage and when the pulse produced by the blocking oscillator 42 is no longer present, the grid 18 will be lowered considerably in potential below the voltage at which grid current flows by an amount approximately equal to the pulse voltage.

The rest of the circuit operates in the general manner described below. Initially, assume that the transducer 60 is uncharged and the voltage of grid 18 is above cutoff so that plate current flows. Due to current through the cathode resistor 12, a rise in cathode voltage with respect to ground is produced. Cathode potential is introduced to the pulse circuit 42 through input terminal 46. The voltage at terminal 46 actuates the transistor blocking oscillator pulse circuit 42 and a large positive pulse appears across the output terminal 48 and the cathode 20. The positive electrode of the transducer 60 is raised in potential with respect to ground by an amount approximately equal to the pulse. The capacitance between the two transducer electrodes cause the negative electrode to tend to the most positive potential possible. The voltage of the cathode 20 rises due to increased plate current, but grid voltage rises slightly more. Grid 18 immediately receives large quantities of electrons from cathode 20 and from the space charge surrounding cathode 20. This large current will pass through grid 18 to the negative electrode of the transducer and will charge the transducer to a voltage approximately equal to the pulse voltage amplitude. When the pulse, which is usually 50–100 micro-seconds long, terminates, the positive electrode is substantially reduced in potential to the potential on battery 44. The negative electrode is reduced in potential by an amount approximately equal to the pulse amplitude due to the capacitance coupling between the electrodes. Grid 18 is commensurately reduced in potential and the plate current is cut off.

When the grid potential rises above cutoff voltage, the plate current will flow again and the cycle will repeat. The number of repetitions per second of this cycle will depend upon the quantitative value of the information measured. The frequency meter will measure the number of pulses per second. It may be a digital device, an R.M.S. meter, or any convenient frequency meter.

A blocking oscillator is only one form of the general types of trigger and pulse circuits which are presently known. It is obvious that any pulse circuit may be used. The blocking oscillator shown here uses the chamber and the tube as part of its operation but a more independent circuit might be used such as a thyratron with on-off firing. The circuit shown in the drawing is a preferred embodiment of the invention.

So that the discharge time will always depend upon the rate of current production in the transducer, the ion chamber should always be charged to a particular potential. In order to obtain better wave shapes and sharper pulses, pulse shaping networks may be incorporated. Such a pulse shaping network assures uniformity of pulse shape and hence of operation of the circuit. Then, when the rate of current production remains constant, the discharge time will not fluctuate due to changes in supply voltage or the characteristics of the electrical elements. If it is desired to change the effective "time constant" of the transducer, an additional capacitor can be provided in parallel with the transducer capacitance.

In still another embodiment of the invention, the capacitance of the transducer may be arranged in series with another capacitor and a voltage source so that, as the charge on the transducer decreases, the voltage on the second capacitor increases. The node between these two capacitors is connected to and controls the grid of the electrometer tube, as in the illustrated circuit.

Since certain changes may be made in the above apparatus without departing from the scope of the invention herein involved, it is intended that all matter contained in the above description, or shown in the accompanying drawings, shall be interpreted as illustrative, and not in a limiting sense.

What is claimed is:

1. An apparatus comprising an input transducer having an electrical output, said input transducer being responsive to external physical stimulus and comprising a current source whose output of current is substantially independent of voltage across the transducer, the transducer having a negative electrode and a positive electrode, an electrometer tube having a grid, cathode, and plate, a source of plate voltage connected to said plate, said grid being connected to said negative electrode, said grid and said negative electrode being substantially completely insulated from ground, so that the node comprising the grid and negative electrode retains a negative electrostatic charge, means for applying a large positive potential difference between said positive electrode and said cathode to cause electrons to be collected by said grid from said cathode so that said transducer is caused to store an electrostatic charge and said grid assumes a large negative voltage when said large positive potential difference is removed from said cathode and positive electrode, said means for applying said large potential difference being energized only when said large negative voltage on the grid is decreased a predetermined amount by current flow through said transducer from said negative electrode, and means for measuring the frequency of application of said large potential difference.

2. The apparatus of claim 1 wherein the transducer is an ion chamber responsive to external ionizing radiation.

3. The apparatus of claim 1 wherein the transducer is a pressure measuring thermionic ion gauge.

References Cited in the file of this patent

UNITED STATES PATENTS

| | | |
|---|---|---|
| 2,642,539 | Lichtman | June 16, 1953 |
| 2,839,678 | De Witz | June 17, 1958 |
| 2,858,448 | Brown et al. | Oct. 28, 1958 |
| 2,874,305 | Wilson et al. | Feb. 17, 1959 |